United States Patent
Reis et al.

(10) Patent No.: US 12,235,387 B2
(45) Date of Patent: Feb. 25, 2025

(54) SENSOR SHIELD AND METHOD

(71) Applicant: International Truck Intellectual Property Company, LLC, Lisle, IL (US)

(72) Inventors: Caio Reis, Aurora, IL (US); Peter S. Wong, Naperville, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 404 days.

(21) Appl. No.: 17/692,615

(22) Filed: Mar. 11, 2022

(65) Prior Publication Data

US 2023/0288534 A1 Sep. 14, 2023

(51) Int. Cl.
  *G01S 7/40* (2006.01)
  *G01S 7/02* (2006.01)
  *G01S 13/93* (2020.01)

(52) U.S. Cl.
  CPC ............ *G01S 7/4043* (2021.05); *G01S 7/027* (2021.05); *G01S 13/93* (2013.01)

(58) Field of Classification Search
  None
  See application file for complete search history.

(56) References Cited

U.S. PATENT DOCUMENTS

| 10,179,549 B2 * | 1/2019 | Buss ...................... B60R 11/04 |
| 2015/0298657 A1 | 10/2015 | Kanter et al. |
| 2019/0212467 A1 | 7/2019 | Xie et al. |
| 2021/0181502 A1 * | 6/2021 | Li ........................... B08B 13/00 |
| 2021/0227113 A1 | 7/2021 | Helmrich |
| 2021/0239795 A1 * | 8/2021 | Kilias ................... B60S 1/0848 |
| 2021/0246708 A1 * | 8/2021 | Mönig ................... B62D 33/03 |
| 2022/0048523 A1 * | 2/2022 | Bretagnol ............... B60R 11/04 |
| 2022/0066032 A1 * | 3/2022 | Glickman .......... G02B 27/0006 |

FOREIGN PATENT DOCUMENTS

| DE | 2926768 A1 | 1/1981 |
| DE | 102017221496 A1 | 6/2019 |
| EP | 0648044 A1 | 4/1995 |

(Continued)

OTHER PUBLICATIONS

"Ford develops a "Tiara" to protect sensors of self-driving vehicles from bugs," New Mobility, https://newmobility.global/autonomous/ford-develops-tiara-protect-sensors-self-driving-vehicles-bugs/ dated Sep. 4, 2019, accessed Nov. 11, 2021 (3 pages).

(Continued)

*Primary Examiner* — Ladimir Magloire
*Assistant Examiner* — David C. Schultz
(74) *Attorney, Agent, or Firm* — Mark C. Bach; Umang Khanna

(57) ABSTRACT

A sensor shield for protecting a sensor having an input surface on a vehicle with a controlling computer and on the vehicle, the sensor shield comprises a sensor-maintenance unit operatively attached to the sensor input surface. Shield implementation devices, each having a bottom surface, are oppositely disposed adjacent the sensor. A shield source is located adjacent the bottom surfaces of the shield implementation devices, and has a surface that covers the input surface of the sensor.

4 Claims, 5 Drawing Sheets

(56) References Cited

FOREIGN PATENT DOCUMENTS

EP            2669123   A1    12/2013

OTHER PUBLICATIONS

"Safety entitled Camera and Sensor Cleaning Systems," Continental Automotive—Safety, https://www.continental-automotive.com/en-gl/Passenger-Cars/Safety/Products/Washer-Systems/Camera-Cleaning-Systems, published 2017, accessed Nov. 11, 2021. (3 pages).

Baker Campbell, Andrew, "Sensor Cleaning Tech: How Engineers Protect Sensors from Bugs, Bird Droppings, Dirt and Grime," AutoVision News, https://www.autovision-news.com/sensing/sensor-technology/sensor-cleaning/May 16, 2020, accessed Nov. 11, 2021 (23 pages).

Vargas, et al., "An Overview of Autonomous Vehicles Sensors and Their Vulnerability to Weather Conditions," Sensors 2021, 21, 5397, https://doi.org/10.3390/s21165397, published Aug. 10, 2021, 23 pages.

Extended European Search Report for European Patent Application No. 23160952.0, dated Aug. 9, 2023 (8 pages).

* cited by examiner

SENSOR SHIELD AND METHOD

BACKGROUND

In some vehicles, a multitude of sensors are utilized to provide information for those vehicles. Input of these sensors may be obscured due to dirt, debris, road chemicals, biomass, or other contaminants on a lens or surfaces that are used to sense ambient environment. It may be desirable to safeguard the sensors from these contaminants.

Manual wiping may be used to reduce contaminants on vehicle sensors. However, various non-manual methods and devices may be used for removing contaminants from a sensor. For example, some sensor surfaces may have specialty coatings that act in a passive manner to lessen impact of the contaminants. If there is air movement on the sensor surface, the coatings can facilitate removal of contaminants from the sensor surface.

Some sensors may be enclosed in compartments or domes that rotate around one axis and incorporate a wiping element to remove contaminants from the sensor surface. Sometimes, rotation of the sensor enclosure in conjunction with vehicle speed may remove contaminants without physical contact from the wiping element. Some automated methods to remove contaminants from sensors include wipers or employment of pressurized air across the sensor surface.

Developing a shield source for a sensor that allows a vehicle computer system to automatically index the shield source in order to improve performance of a sensor system is relevant for industries that use sensors. Therefore, it is desirable to provide a shield source for protecting the sensor system of a vehicle from degraded performance.

SUMMARY

This disclosure includes embodiments of a sensor shield for protecting a sensor of a vehicle. One embodiment provides a sensor shield for protecting a sensor having an input surface on a vehicle with a controlling computer and on the vehicle. The sensor shield comprises a sensor-maintenance unit operatively attached to the sensor input surface. Shield implementation devices, each having a bottom surface, are oppositely disposed adjacent the sensor. A shield source is located adjacent the bottom surfaces of the shield implementation devices, and has a surface that covers the input surface of the sensor.

DETAILED DESCRIPTION

The following detailed description is a contemplated mode of carrying out a sensor shield and process described herein. Although the sensor shield process is explained in relation to illustrated embodiments, it is to be understood that many other possible modifications and variations can be made without departing from the spirit and scope of the disclosure. Therefore, a sensor shield may be used to protect various types of sensors including a camera, sonar, laser, radar, and a plurality of other sensors. These sensors may be used to scan and to record information from an external environment and/or an internal environment of stationary or non-stationary vehicle such as a truck, an aircraft, a boat, a train and the like, or in a stationary environment such as on a wall, a seating arrangement in a public area, a hallway, an entryway, and in any environment where a sensor can be used for detecting and identifying environmental conditions.

It is understood that the term vehicle as described herein includes an electric vehicle, a truck, a passenger vehicle, a hybrid vehicle, a sport utility vehicle, a bus, a water vehicle, a commercial vehicle, a fuel-driven vehicle and the like.

Figure 1:
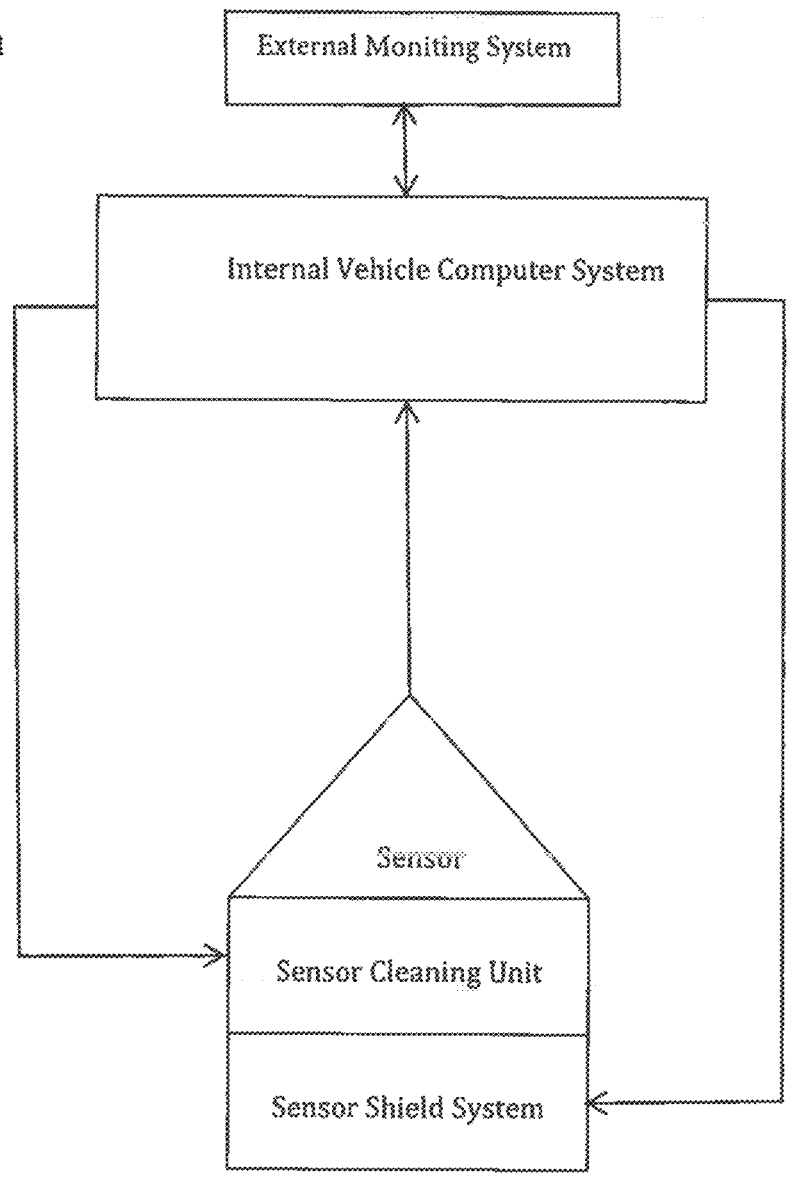
FIG. 1 is a flow chart showing a sensor shield described herein.
Figure 2:
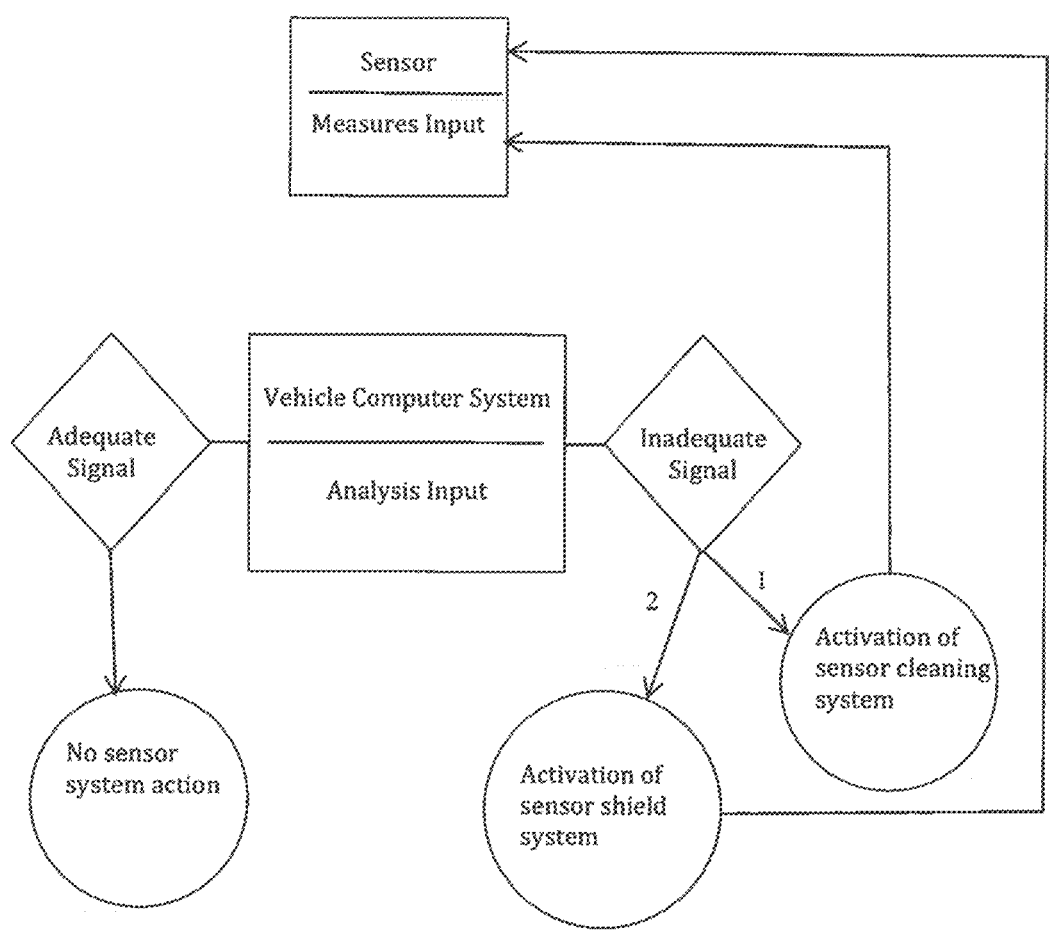
FIG. 2 is a flow chart showing response of a computer system of a vehicle to a sensor surface condition.

It is further understood that a sensor shield 10 and method of use thereof may be a part of an external vehicle monitoring system which can be in wireless communication with a sensor 12 on a vehicle 14. For example, FIGS. 1 and 2 are flow charts showing interoperability of the sensor shield 10 with a computer system, not shown for clarity, associated with the vehicle 14. Such a computer system can include external vehicle monitoring systems such as a command center, a truck monitoring station, a vehicle integrated computer system and the like that communicate wirelessly with the vehicle 14.

Figure 3:
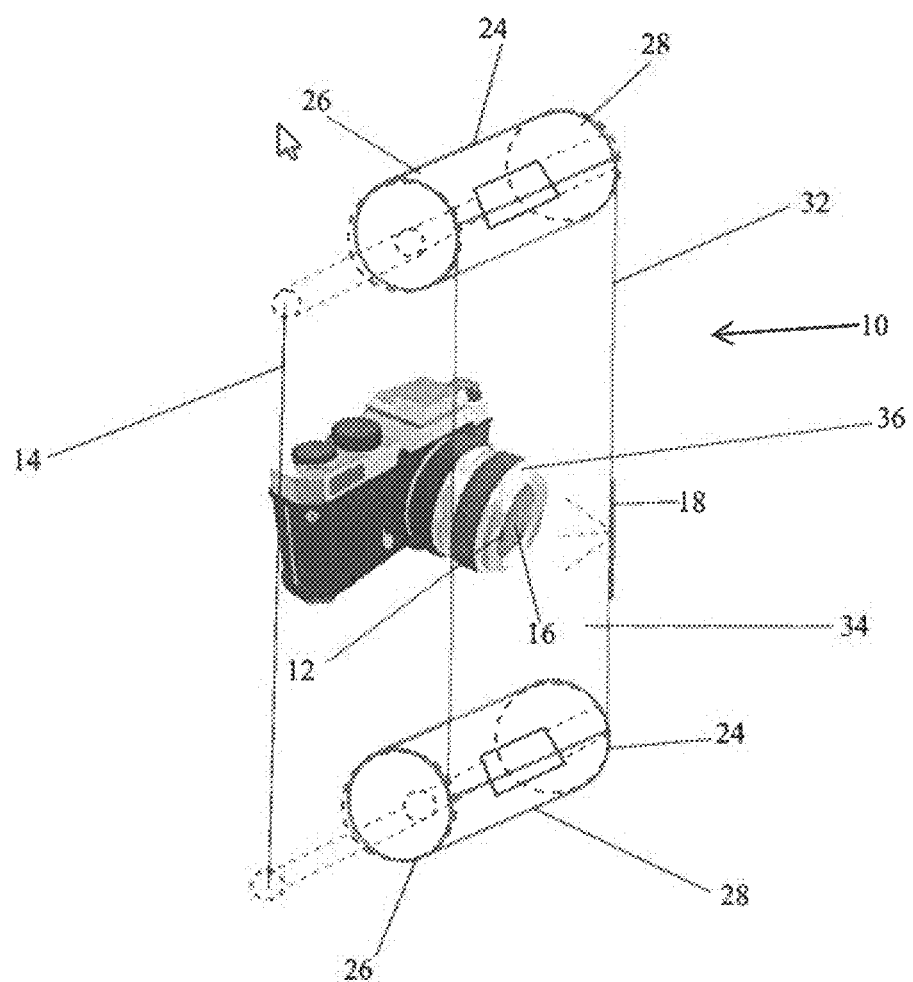
FIG. 3 illustrates one embodiment of a sensor shield.

FIG. 3 shows one embodiment of the sensor shield 10 for protecting the sensor 12 of the vehicle 14. The sensor 12 of the vehicle 14 has an input surface 16 and at least one sensor-maintenance unit 18 operatively attached to the input surface 16. The sensor 12 of the vehicle 14 communicates with the computer system of the vehicle 14. The computer system of the vehicle 14 is controllably connected with and controls the sensor-maintenance unit 18 of the vehicle 14 and the sensor shield 10.

In the illustrated embodiments, the sensor shield 10 has at least a first shield implementation device 22 and a second shield implementation device 24, oppositely disposed adjacent the sensor 12. Both the first shield implementation device 22 and the second shield implementation device 24 have a top surface 26 and a bottom surface 28 for receiving a shield source 32 located adjacent the bottom surface 28 of both the first shield implementation device 22 and the second shield implementation device 24. The first shield implementation device 22 and the second shield implementation device 24 can be rotatable devices such as a roller, a revolving cylinder, a spool holder, a carousel, a rotatable ring, a disk, a wheel and the like for engaging the shield source 32. The shield source 32 can include a shield, a cover, a guard, and the like having a size and a surface 34 for covering the input surface 16 of the sensor 12.

In one embodiment, the shield source 32 is constructed of a flexible sheet of transparent material, such as a plastic or other material that can be coated to protect the input surface 16 of the sensor 12 from a contaminant. The first shield implementation device 22 and the second shield implementation device 24 are mounted to the vehicle 14 and are provided adjacent a side 36 of the sensor 12. In the embodiments shown in FIGS. 3 through 5, the first shield implementation device 22 and the second shield implementation device 24 have an electrical connection with a motor and a motor driver that advance the shield source 32 in accordance with at least one advancement sequence. Both the first shield implementation device 22 and the second shield implementation device 24 have a controller configured to receive communication from the computer system of the vehicle 14. The computer system of the vehicle 14 is configured to send a command to the first implantation device 22 and the second shield implementation device 24. At least one command from the computer system regulates advancement of the shield source 32 in accordance with detection of at least a first sensor surface condition and the sensor-maintenance unit 18 performing at least one sensor-maintenance sequence. With advancement of the shield source 32, the sensor 12 communicates with the computer system of the vehicle 14 to direct removal of the shield source 32 and the provision of a new shield source 32.

The sensor 12 detects at least the first sensor surface condition and the computer system of the vehicle 14 enables the sensor-maintenance unit 18 to change the first sensor surface condition. The computer system of the vehicle 14 further enables the first shield implementation device 22 and the second shield implementation device 24 to advance the shield source 32 in response to first deployment of the sensor-maintenance unit 18 if the first sensor surface condition is outside of a specified range. A first sensor surface condition can include presence of a contaminant, such as salt, snow, dirt, dust, and other types of environmental contamination. The sensor-maintenance unit 18 can include a wiper, pressurized air or any commercially available sensor-maintenance unit that removes a contaminant from a sensor. The advancement sequence comprises the first shield implementation device 22 receiving the shield source 32 in an undeployed. i.e. rolled, configuration and the second shield implementation device 24 accommodating advanced portions of the shield source 32.

The motor driver regulates intermittent release of the shield source 32 according to at least a first sensor surface condition. The motor driver establishes a reeling start and a reeling end of the shield source 32. The motor driver can immobilize the shield source 32 based on a signal from the sensor 12. The sensor shield 10 thereby transmits information identifying location of the shield source 32 adjacent the input surface 16 of the sensor. The shield implementation device 22 and the shield implementation device 24 permit the shield source 32 to be balanced and to calibrate any imbalance of the shield source 32 through advancement of the shield source 32.

The shield source 32 extends over the sensor 12 and is positioned to abut the input surface 16 and to be frictionally fitted thereover to obstruct a contaminant from coming between the sensor 12 and the shield source 32 while allowing for movement of the shield source 32. This allows for decontamination, repair, maintenance, and/or replacement of the shield source 32.

Once deployed, the shield source 32 operates as a second input surface for protecting the input surface 14 of the sensor 12. This also improves performance of the sensor 12 by reducing performance degradation due to dirt, snow, salt, and other contaminants that are encountered by a vehicle 14.

Figure 4:
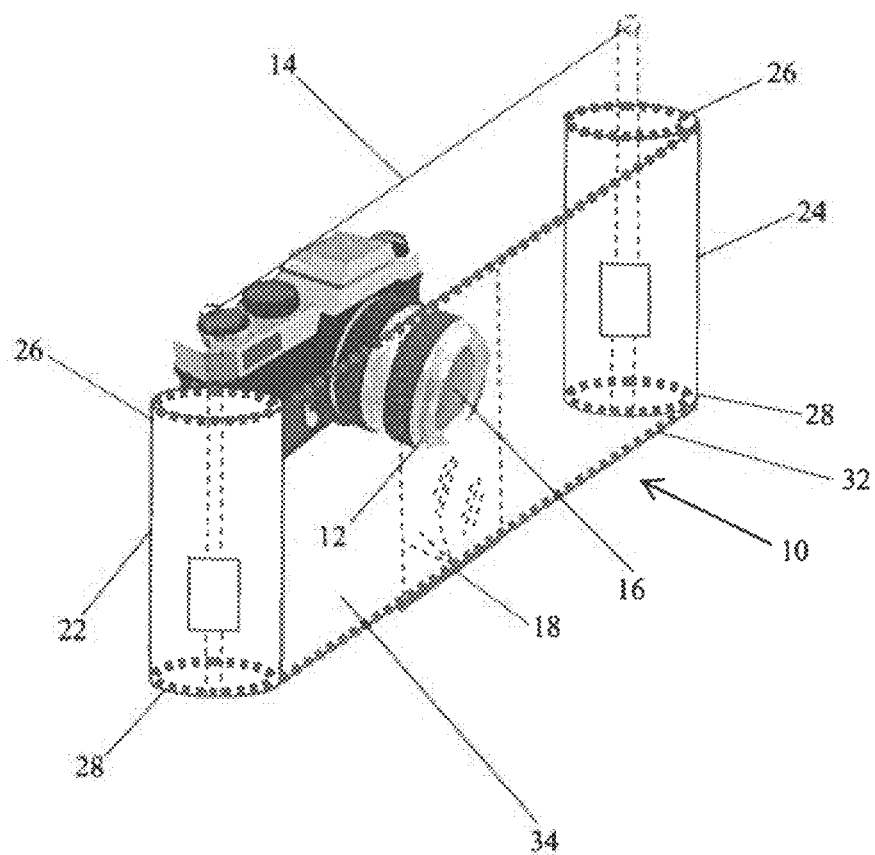
FIG. 4 illustrates another embodiment of a sensor shield.
Figure 5:
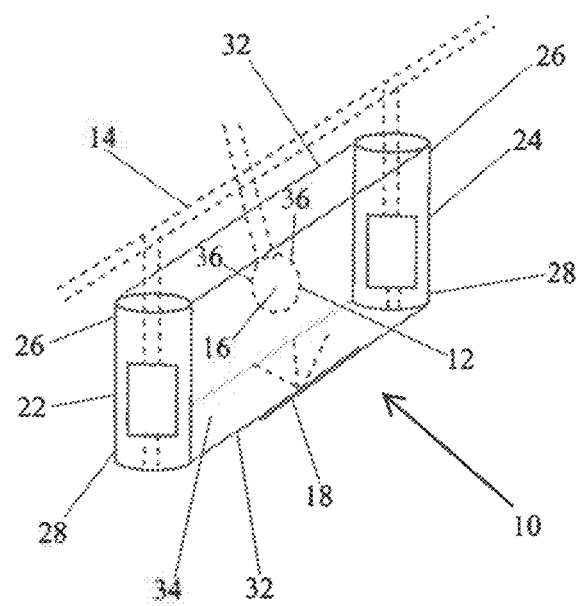
FIG. 5 illustrates a further embodiment of a sensor shield.

In a particular embodiment shown in FIG. 4, the shield source 32 comprises a plurality of equally partitioned segments 38 provided in a rolled up configuration on the first shield implementation device 22 and the second shield implementation device 24. Each individual shield source 32 of the plurality of equally partitioned segments 38 can be connected to opposing longitudinal edges for a rolling connection to the shield implementation device 22 and the shield implementation device 24 and for traversing the sensor 12. The opposing longitudinal edges can be constructed of a flexible sheet of transparent material and could function as retainer engaging the top surface 26 of the shield implementation device 22 and bottom surface 28 of the shield implementation device 24. An individual segment of the plurality of equally partitioned segments 38 can provide frictional engagement with the top surface 26 of the shield implementation device 22 and bottom surface 28 of the shield implementation device 24 to continuously sustain a holding and rotatable state therebetween. The shield implementation device 22 and the shield implementation device 24 can advance the plurality of equally partitioned segments 38 consecutively across the sensor 12. At least one command of the computer system regulates advancement of each of the plurality of equally partitioned segments 38 in accordance with performance data of the sensor 12. The computer system can identify advancement of all of the plurality of equally partitioned segments 38. Each individual shield source 32 of the plurality of equally partitioned segments 38 can be removed, replaced, cleaned and reused. The plurality of equally partitioned segments 38 can comprise a plurality of shapes, sizes, and thickness to facilitate proper maintenance and/or operation of the sensor 12.

In a further embodiment shown in FIG. 4, the shield implementation device 22 and the shield implementation device 24 may be located adjacent two opposing sides 36 of the sensor 12. The shield source 32 is included on the first shield implementation device 22 and the second shield implementation device 24 in a conveyor belt configuration. Therefore in this embodiment, the shield source 32 is rotatable about the sides 36 of the sensor 12 depending on position of the shield implementation device 22 and shield implementation device 24. This shield implementation device arrangement can include support an element, a magnet, a belt and the like at a position adjacent the top surfaces 26 and the bottom surfaces 28 of the shield implementation device 22 and the shield implementation devices 24 to hold the shield source 32 in place during and after deployment.

What is claimed is:

1. A sensor shield for protecting a sensor of a vehicle, the sensor shield comprising:
 at least one sensor-maintenance unit operatively attached to the input surface of the sensor;
 a first shield implementation device having a first surface and a second surface and a second shield implementation device having a first surface and a second surface, the first shield implementation device and the second shield implementation device both either one of horizontally or vertically and oppositely disposed adjacent the sensor; and
 a shield source located adjacent the second surface of both the first shield implementation device and the second shield implementation device, the shield source having a surface that covers the input surface of the sensor; wherein the shield source is included on the first shield implementation device and the second shield implementation device in a conveyor belt configuration.

2. The sensor shield defined in claim 1 wherein the first shield implementation device receives the shield source in a rolled configuration.

3. The sensor shield defined in claim 1 wherein the shield source comprises a plurality of segments.

4. The sensor shield defined in claim 3 wherein the segments are equally partitioned.

* * * * *